United States Patent [19]
Noethen

[11] Patent Number: 5,331,468
[45] Date of Patent: Jul. 19, 1994

[54] INTENSITY REDISTRIBUTION FOR EXPOSURE CORRECTION IN AN OVERFILLED SYMMETRICAL LASER PRINTER

[75] Inventor: Mark L. Noethen, Rochester, N.Y.

[73] Assignee: Eastman Kodak Company, Rochester, N.Y.

[21] Appl. No.: 982,322

[22] Filed: Nov. 27, 1992

[51] Int. Cl.$^5$ .......................... G02B 9/00; G02B 26/08
[52] U.S. Cl. .................................... 359/738; 359/196
[58] Field of Search ................ 359/738, 739, 740, 196

[56] References Cited

U.S. PATENT DOCUMENTS

| | | | |
|---|---|---|---|
| 3,465,347 | 9/1969 | Hudson | 346/1 |
| 4,247,763 | 1/1981 | Stauffer | 250/204 |
| 4,253,734 | 3/1981 | Komuraski et al. | 350/386 |
| 4,264,125 | 4/1981 | Shibata | 350/96.14 |
| 4,460,249 | 7/1984 | Vincent | 350/356 |
| 4,469,407 | 9/1984 | Cowan et al. | 359/738 |
| 4,902,105 | 2/1990 | Welzen et al. | 350/346 |
| 4,941,721 | 7/1990 | Banton et al. | 350/6.8 |
| 4,978,185 | 12/1990 | Appel | 350/6.8 |
| 4,982,152 | 1/1991 | Takahashi et al. | 324/96 |
| 5,048,938 | 9/1991 | Hizny | 359/652 |
| 5,061,046 | 10/1991 | Lee et al. | 359/53 |

OTHER PUBLICATIONS

Dew & Parsons, *Absorbing Filter to Flatten Gaussian Beams*, Applied Optics, vol. 31, No. 18, pp. 3416–3419, Jun. 1992.
Aleksoff et al., *Holographic Conversion of a Gaussian Beam to a Near-Field Uniform Beam*, Optical Eng., vol. 30, No. 5, pp. 537–538, May 1991.
Roux, *Intensity Distribution Transformation for Rotationally Symmetric Beam Shaping*, Optical Eng., vol. 30, No. 5, pp. 529–530, May 1991.
Roberts, *Beam Shaping by Holographic Filters*, Applied Optics, vol. 28, No. 1, pp. 31–32, Jan. 1989.
Han et al., *Reshaping Collimated Laser Beams with Gaussian Profile to Uniform Profiles*, Applied Optics, vol. 22, No. 22, pp. 3644–36457, Nov. 1983.
Veldkamp, *Laser Beam Profile Shaping with Interlaced Binary Diffraction Gratings*, Applied Optics, vol. 21, No. 17, pp. 3209–3210, Sep. 1982.

Primary Examiner—Scott J. Sugarman
Attorney, Agent, or Firm—Dennis R. Arndt

[57] ABSTRACT

A method for redistributing intensity of a Gaussian beam of light having a Gaussian shaped intensity profile comprises the steps of exposing a photosensitive material to a scanning beam of a laser printing apparatus, writing a desired pattern onto the photosensitive material with the laser printing apparatus, and interposing the exposed photosensitive material in the Gaussian beam and flattening the Gaussian shaped intensity profile of the Gaussian beam. A beam shaper has a laser source for producing a beam of light, a collimating lens for receiving the beam of light from the laser source and producing a collimated beam of light, an apodizer for receiving the collimated beam of light and flattening a Gaussian intensity of the collimated beam in one dimension only, and shaping optics for receiving the beam from the apodizer and producing a beam that is large in a line scan direction.

7 Claims, 4 Drawing Sheets

INTENSITY REDISTRIBUTION FOR EXPOSURE CORRECTION IN AN OVERFILLED SYMMETRICAL LASER PRINTER

TECHNICAL FIELD OF THE INVENTION

The present invention relates generally to laser scanners and printers having a polygon mirror for deflecting a beam of light, and, more particularly, to a method and apparatus for compensating for beam intensity fall off in an overfilled polygon laser scanner.

BACKGROUND OF THE INVENTION

In an overfilled symmetrical laser printer (OSLP) it is necessary to compensate for the fall off in exposure from the center to the edge of the scan caused by the deflector surface scanning across the Gaussian intensity shape of the input beam. This is a fall off in one dimension, namely the line scan direction (the beam is focused in the page direction so the deflector is not overfilled in the page direction). It is desirable to correct this shape by reshaping the beam intensity profile to be flatter, or even smile shaped to compensate other sources of exposure fall off. It is desirable to have a one dimensional correction that minimizes the loss of light.

U.S. Pat. No. 4,941,721 discloses the use of two aspheric lenses to achieve the desired beam profile for use in an input scanner rather than output printer. However, it is not a symmetrical system and requires the fabrication of aspheres. U.S. Pat. No. 3,465,347 discloses an absorbing filter but it is a thick absorber, glass or liquid, two dimensional, and used in a nonsymmetrical scanner. Articles by Han, Roberts, Veldkamp, Roux, and Aleksoff describe computer fabricated diffractive optics schemes which can be low in transmission and are wavelength sensitive, Han, Ishii and Murata, Reshaping Collimated Laser Beams with Gaussian Profile to Uniform Profiles, Applied Optics, Vol. 22, No. 22, (1983), N. C. Roberts, Beam Shaping by Holographic Filters, Applied Optics, Vol. 28, No. 1, (1989), W. B. Veldkamp, Laser Beam Profile Shaping with Interlaced Binary Diffraction Gratings, Applied Optics, Vol. 21, No. 17, (1982), F. S. Roux, Intensity Distribution Transformation for Rotationally Symmetric Beam Shaping, Optical Engineering, Vol. 30, No. 5, (1991) and Aleksoff, Ellis and Neagle, Holographic Conversion of a Gaussian Beam to a Near-Field Uniform Beam, Optical Engineering, Vol. 30, No. 5 (1991).

U.S. Pat. No. 5,061,046 discloses a gradient index liquid crystal device. A laser beam apodizer using cholesteric liquid crystals provides a soft edge profile using two separate cholesteric liquid crystal mixtures with different selective reflection bands, which, in an overlap region, have a gradient index where reflectivity changes as a function of position. The apodizer can be configured as a one dimensional beam apodizer with a clear aperture which can be mechanically adjusted by sliding two complimentary devices relative to each other, and as a circular beam apodizer.

Dew and Parsons, Absorbing Filter to Flatten Gaussian Beams, Applied Optics, Vol. 31 No. 18, Jun. 20, 1992, disclose an absorbing filter that flattens the Gaussian intensity profile of a laser beam. The filter was fabricated by dc magnetron sputtering a thin tantalum film, by using a combination of substrate masking and motion.

It will be appreciated that it would be highly desirable to compensate for Gaussian intensity fall off without the use of complicated, bulky or expensive components, such as aspheres or liquid crystals, and without using complicated or expensive methods, such as dc magnetron sputtering. A simple apodizer can be made on photographic film or plates, and such apodizers are typically fabricated by contact projection or variable exposure printing. It is desirable to fabricate an apodizer on a photographic film or plate that is inverse Gaussian in transmission and simple to fabricate.

SUMMARY OF THE INVENTION

The present invention is directed to overcoming one or more of the problems set forth above. Briefly summarized, according to one aspect of the invention, a method for creating a one dimensional apodizer comprises the steps of exposing a photosensitive material to a scanning beam of a laser printing apparatus, and writing an inverse Gaussian pattern onto the photosensitive material with the laser printing apparatus.

A method for redistributing intensity of a Gaussian beam of light having a Gaussian shaped intensity profile comprises the steps of exposing a photosensitive material to a scanning beam of a laser printing apparatus, writing a desired pattern onto the photosensitive material with the laser printing apparatus, and interposing the exposed photosensitive material in the Gaussian beam and flattening the Gaussian shaped intensity profile of the Gaussian beam. The Gaussian beam is flattened in one dimension only.

According to another aspect of the invention, a method for operating a laser scanning device having an optical axis and having a polygon mirror with a plurality of facets comprises the steps of directing a beam of light having a Gaussian shaped intensity profile towards the polygon mirror, and interposing a photosensitive material in the beam of light and flattening the Gaussian shaped intensity profile in one dimension.

A beam shaper comprises a laser source for producing a beam of light, a collimating lens for receiving the beam of light from the laser source and producing a collimated beam of light, an apodizer for receiving the collimated beam of light and flattening a Gaussian intensity of the collimated beam in one dimension only, and shaping optics for receiving the beam from the apodizer and producing a beam that is large in a line scan direction.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
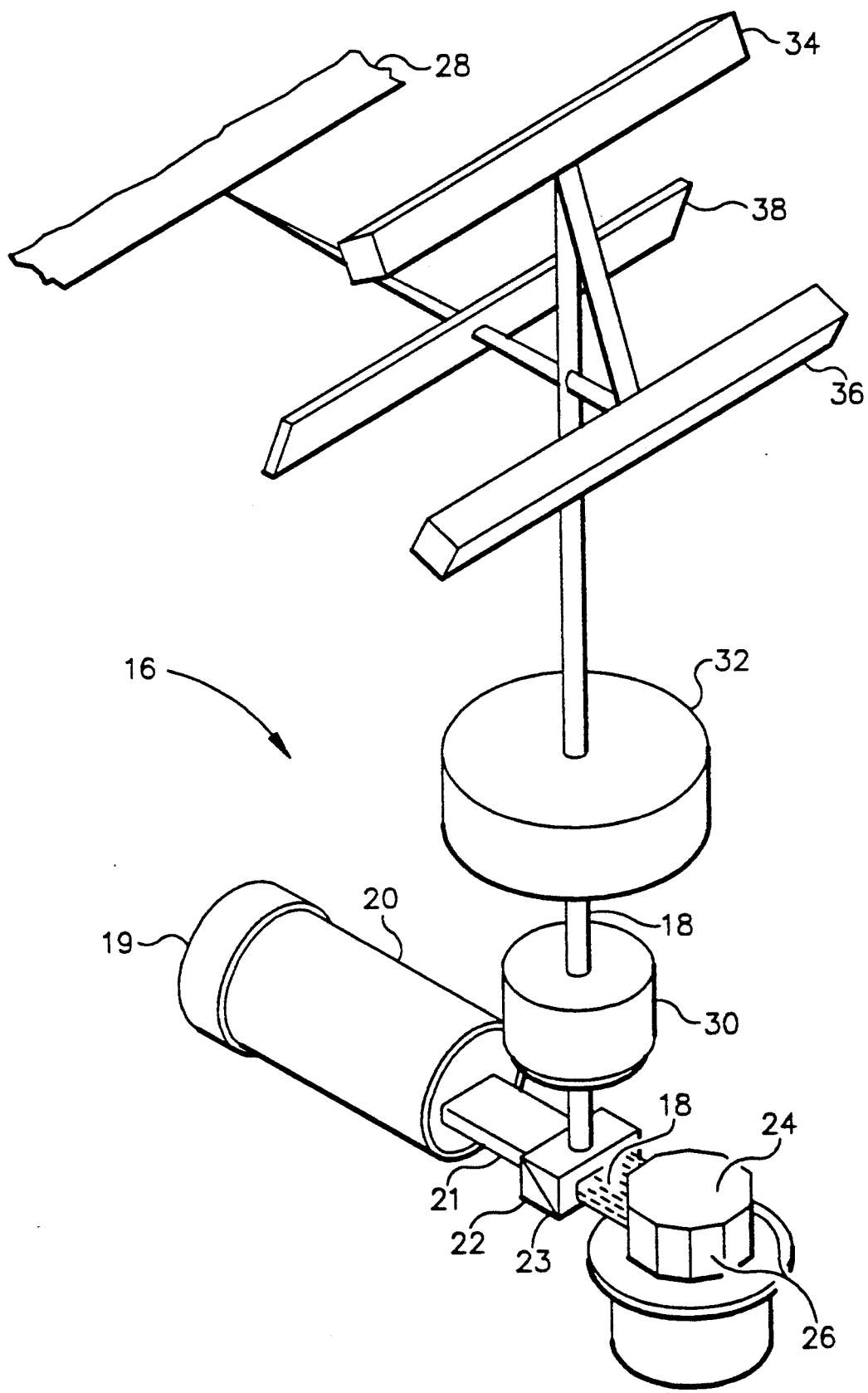
FIG. 1 is a diagrammatic perspective view of a laser scanner having a polygon mirror operating in an overfilled symmetrical mode.

Referring to FIG. 1, a laser writer or other laser scanning device 16 has an optical axis 18. A laser 19 and beam shaper 20 produce a beam of light 21 that is large in the line scan direction and limited in the page scan direction. The beam is directed to a polarizing beam splitter 22 and retarder 23. A portion of the beam is directed to a polygon mirror 24 that has a plurality of mirror facets 26. The input beam is wide enough to completely fill at least one facet 26, and preferably, completely fills three of the mirror facets 26. The beam is reflected from the polygon 24 so that the reflected beam is symmetrically positioned about the optical axis thereby making the device both overfilled and symmetrical.

The reflected beam is redirected by the polarizing beam splitter 22 and retarder 23 to the image plane 28. The reflected beam is redirected to a first spherical scanning lens 30 and a second spherical scanning lens 32, and then travels to a cylinder mirror 34 where it is directed to a folding mirror 36 which directs it towards a window 38. The beam exiting the window 38 finds the image plane 28, which may be a photoconductive drum. The beam reflected off the folding mirror 36 may intercept the optical path of the beam directed from the spherical scanning lenses 30, 32 to the cylinder mirror 36.

Figure 6:
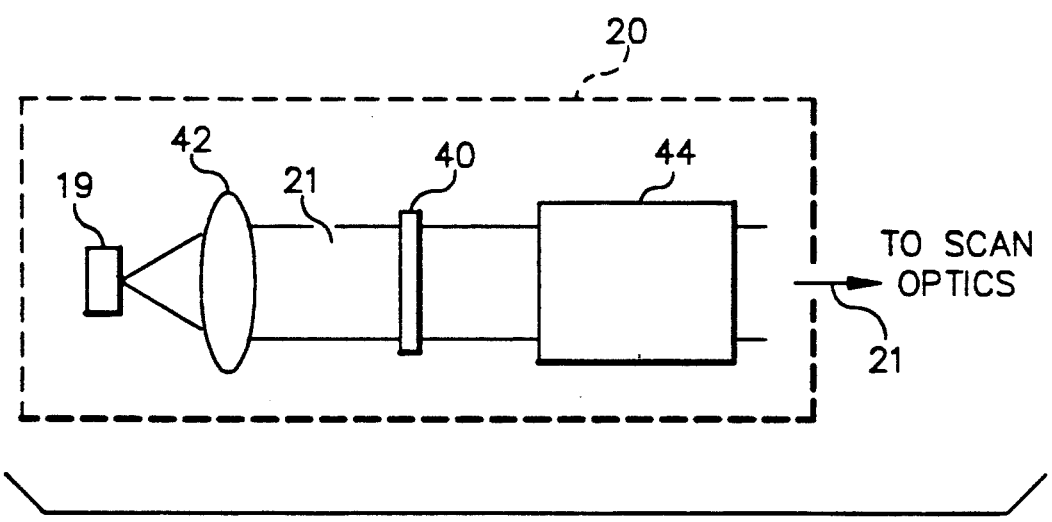
FIG. 6 is a schematic diagram illustrating a preferred location of the beam apodizer.
Figure 7:
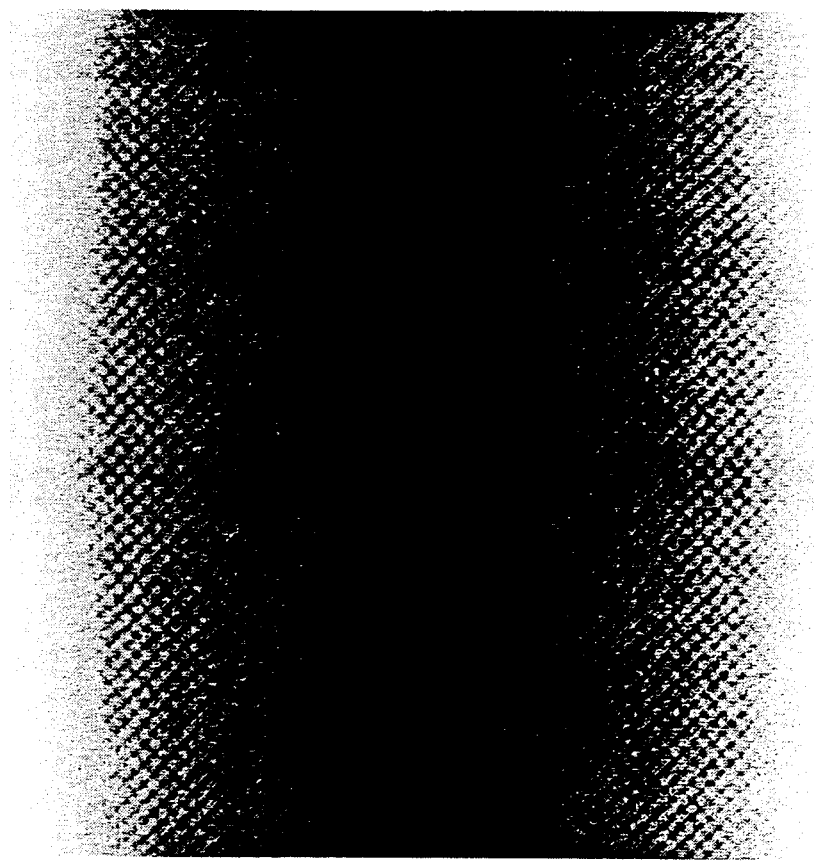
FIG. 7 is a front view of an apodizer according to the present invention.

Referring to FIG. 6, the beam shaper 20 is illustrated with the apodizer 40 interposed between the collimating lens 42 and shaping optics 44 to flatten the intensity profile of the beam 21 emanating from the laser 19. The laser source 19 produces the beam of light 21 which is directed to the collimating lens 42. The collimating lens 42 receives the beam of light 21 from the laser source and produces a collimated beam of light. The apodizer 40, which is a photosensitive material that has an inverse Gaussian pattern written thereon with a laser writing apparatus, receives the collimated beam of light and flattens a Gaussian intensity of the collimated beam in one dimension only. The shaping optics then receives the flattened beam from the apodizer and produces a beam that is large in a line scan direction.

An important aspect of the present invention is its use in a printer in an overfilled symmetrical configuration. By overfilled it is meant that a large beam is directed to the polygon mirror to cover more than one mirror facet of the polygon. The scanning beam is basically a portion of the incoming beam as reflected by one facet.

Figure 2:
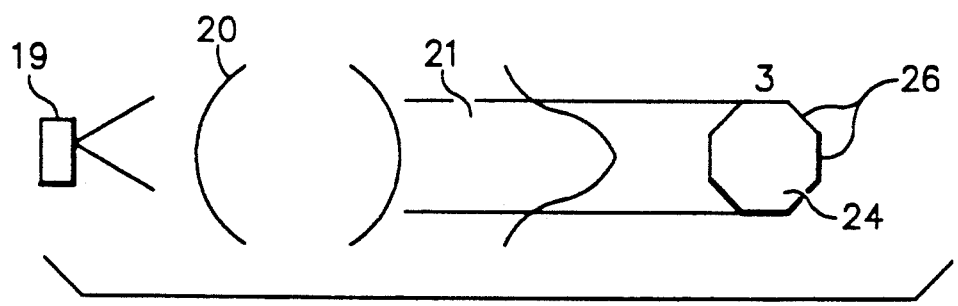
FIG. 2 is a diagrammatic top view illustrating the intensity fall off of a Gaussian beam at the mirror facet of the polygon mirror of FIG. 1.
Figure 3:
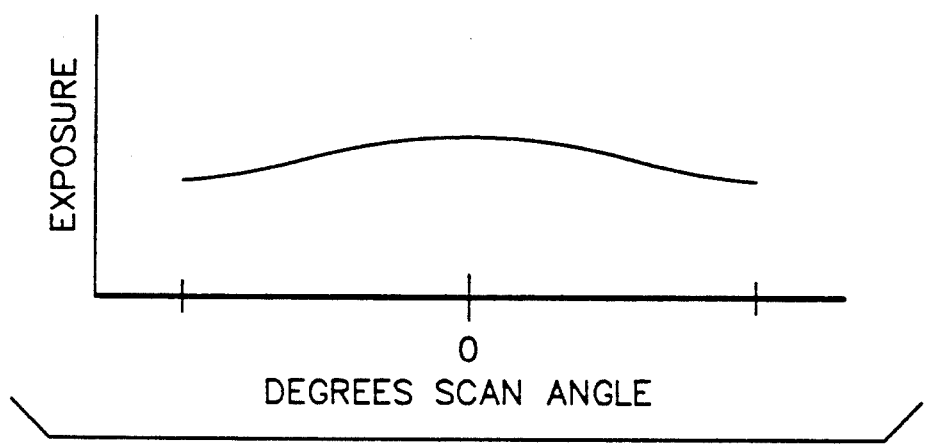
FIG. 3 is a graph illustrating the intensity fall off of the beam of FIG. 2.

When the Gaussian beam is scanned by the deflector, a fall off in exposure occurs from the center to the edge of scan due to the Gaussian shape of the input beam. FIG. 2 is a top view of the problem where, in scanning the overfilled beam, the facet will reflect the variable intensity level of the beam. FIG. 3 illustrates the intensity fall off which can be 10 or 20 percent depending on the system.

A solution to the intensity fall off problem is to flatten the beam profile only to the extent needed so as to minimize the loss of light. Also, flattening is necessary only in one dimension which further reduces the loss of light. Such an apodizer can be made by using a digital laser printer which can be programmed to write the desired pattern onto film or a photosensitive plate. The peak normalized Gaussian beam intensity incident on the apodizer is given by the expression:

$$I_0 = e^{-2\left(\frac{x}{w}\right)^2},$$

where $x$ is the distance from the beam center peak, and $w$ is the $e^{-2}$ radius of the beam intensity. If the deflector scans to a distance $x = x'$ on the beam, the apodizer should have a transmission function of $$I_1 = \begin{bmatrix} \alpha e_1^{2\left[\frac{x}{w}\right]^2} & 0 \leq |x| \leq x' \\ & x' \leq |x| \end{bmatrix}$$

where $\alpha$ is the value of $I_1$ evaluated at $x = x'$ and $0 \leq \alpha \leq 1$. Therefore, the output transmitted function will be $$I_2 = \begin{bmatrix} \alpha & 0 \leq |x| \leq x' \\ e^{-2\left[\frac{x}{w}\right]^2} & x' \leq |x| \end{bmatrix}.$$

The beam needs to be flattened to this point only, thus minimizing the loss of light. Further, it is necessary in only the line scan direction, again providing for minimal loss of light.

Figure 4:
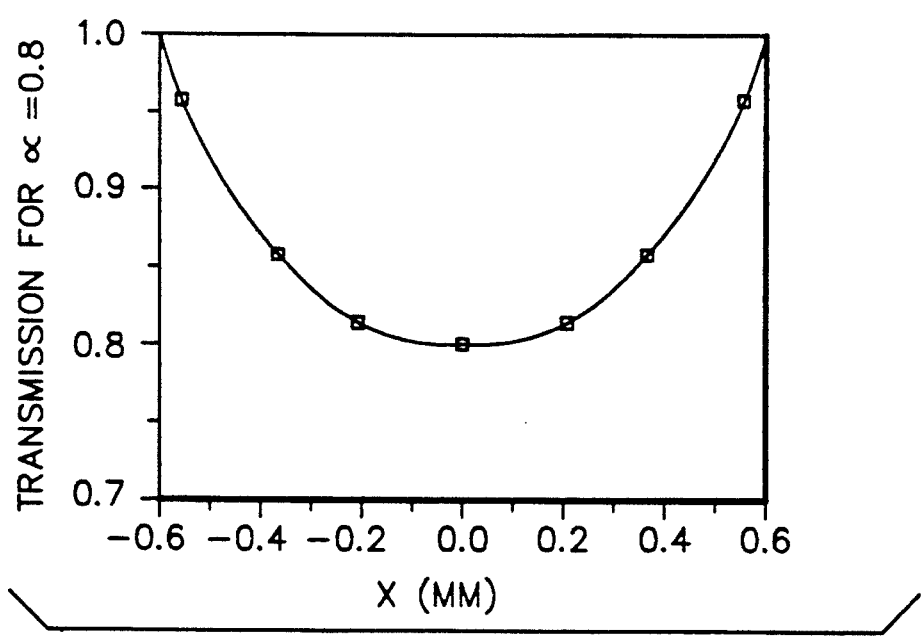
FIG. 4 is a graph illustrating filter transmission functions with $\alpha = 0.8$.
Figure 5:
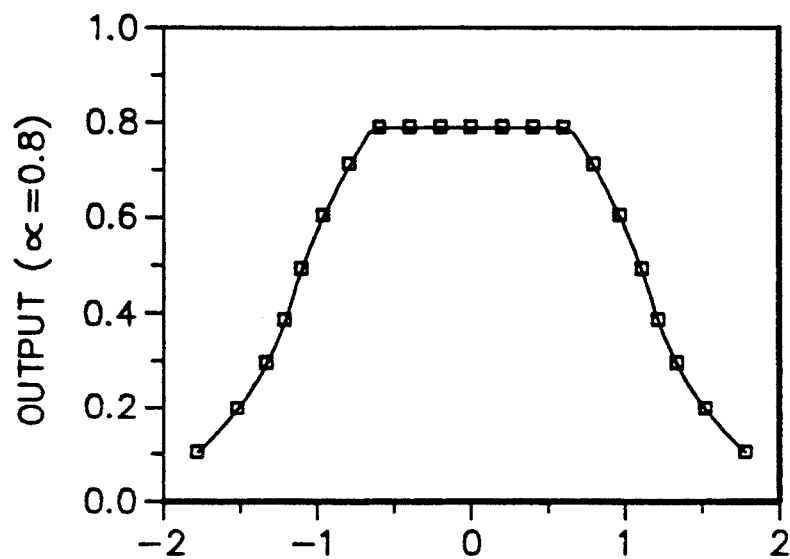
FIG. 5 is a graph illustrating the output of the filter represented in FIG. 4.

FIG. 4 illustrates an example of a filter transmission functions with $\alpha = 0.8$, and FIG. 5 illustrates the output resulting from this filter. It is seen that there is a good parabolic curve fit. It is thus seen that the beam is flattened to the extent needed. This is a one dimensional modeling, but the functions of apodization in the line scan direction and soft or hard edge truncation for beam size control in the page direction can be combined.

The beam may be flattened to a variable extent thereby correcting exposure fall off partially or completely, and may also be apodized to produce an over corrected condition with a smile profile for correcting other sources of exposure fall off in a given system.

Use of a gradient index (GRIN) lens for performance equivalent to an asphere is well known. Two such elements with spherical surfaces can be used here to perform the same function as the two asphere system. Cost savings is possible because spherical surfaces are easier to fabricate than aspheres. Electronically modulating the laser beam as it is scanned along the surface of the media can also be used. This puts the burden on the electronics instead of the optics and is a choice to be made depending on the system requirements, such as the laser power and dynamic range available, cost, and feasibility of the extent of correction desired. Diffractive optical elements can be digitally created, such as computer generated holograms, and can be one dimensional. Depending on the method, diffractive elements can be lossy which may or may not be tolerable. Used with a suitably stabilized laser, they could be used in the present invention.

While the invention has been described with particular reference to the preferred embodiments, it will be understood by those skilled in the art that various changes may be made and equivalents may be substituted for elements of the preferred embodiment without departing from invention. For example, the apodizer is shown internal to the beam shaper but may be externally located. In addition, many modifications may be made to adapt a particular situation and material to a teaching of the invention without departing from the essential teachings of the present invention.

Operation of the present invention is believed to be apparent from the foregoing description and drawings, but a few words will be added for emphasis. The apodizer is interposed in the beam to flatten the Gaussian intensity profile of the beam in one dimension. The apodizer is preferably part of a beam shaper which includes a laser source for producing a beam of light, a collimating lens for receiving the beam of light from the laser source and producing a collimated beam of light, an apodizer for receiving the collimated beam of light and flattening a Gaussian intensity of the collimated beam in one dimension only, and shaping optics for receiving the beam from the apodizer and producing a beam that is large in a line scan direction. The apodizer comprises a photosensitive material having an inverse Gaussian pattern formed thereon by exposing a photosensitive material to a scanning beam of a laser printing apparatus, developing the exposed photosensitive material, and writing an inverse Gaussian pattern onto the photosensitive material with the laser printing apparatus.

It can now be appreciated that there has been disclosed a method for redistributing the intensity of a beam of light having a Gaussian shaped intensity profile. The method includes exposing a photosensitive material to a scanning beam of a laser printing apparatus, writing a desired pattern onto the photosensitive material with the laser printing apparatus, and interposing the exposed photosensitive material in the Gaussian beam and flattening the Gaussian shaped intensity profile of the Gaussian beam. The method thereby produces a simple one dimensional apodizer.

It can also be appreciated that there has been disclosed a method for operating a laser scanning device having an optical axis and having a polygon mirror with a plurality of facets. The method includes directing a beam of light having a Gaussian shaped intensity profile towards the polygon mirror, and interposing a photosensitive material in the beam of light and flattening the Gaussian shaped intensity profile.

As is evident from the foregoing description, certain aspects of the invention are not limited to the particular details of the examples illustrated, and it is therefore contemplated that other modifications and applications will occur to those skilled the art. It is accordingly intended that the claims shall cover all such modifications and applications as do not depart from the true spirit and scope of the invention.

What is claimed is:

1. A beam shaper, comprising:
    a laser source for producing a beam of light;
    a collimating lens for receiving said beam of light from said laser source and producing a collimated beam of light;
    an apodizer for receiving said collimated beam of light and flattening a Gaussian intensity of said collimated beam in one dimension only; and
    shaping optics for receiving said beam from said apodizer and producing a beam that is large in a line scan direction.

2. A beam shaper, as set forth in claim 1, wherein said apodizer comprises a photosensitive material having an inverse Gaussian pattern digitally written thereon with a laser writing apparatus.

3. A method for redistributing in one dimension only the intensity of a beam of light having a Gaussian shaped intensity profile, comprising the steps of:
    exposing a photosensitive material to a scanning beam of a laser printing apparatus;
    digitally writing a desired pattern onto the photosensitive material with the laser printing apparatus;
    developing the exposed photosensitive material; and
    interposing the exposed photosensitive material in the Gaussian beam and flattening the Gaussian shaped intensity profile of the Gaussian beam.

4. A method, as set forth in claim 3, including the step of writing an inverse Gaussian pattern onto the photosensitive material with the laser printing apparatus.

5. A method for operating a laser scanning device having an optical axis and having a polygon mirror with a plurality of facets, comprising the steps of:
    directing a beam of light having a Gaussian shaped intensity profile towards said polygon mirror; and
    interposing an apodizer in said beam of light before said polygon mirror and flattening said Gaussian shaped intensity profile in one dimension only.

6. A method, as set forth in claim 5, including the steps of:
    filling at least one of said facets with said beam;
    overflowing said beam onto an adjacent facet; and
    reflecting said beam from said rotating polygon mirror so that the reflected beam is symmetrically positioned about said optical axis.

7. A method for creating a one dimensional apodizer, comprising the steps of:
    exposing a photosensitive material to a scanning beam of a laser printing apparatus and digitally writing an inverse Gaussian pattern onto the photosensitive material with the laser printing apparatus; and
    developing the exposed photosensitive material.

* * * * *